SOUND REPRODUCING MECHANISM

Filed Jan. 16, 1967 5 Sheets-Sheet 1

INVENTORS
GUNARS LICITIS
MARVIN I. GLASS
PETER ALEKSA

BY Lucas & Coffee
ATTORNEYS

SOUND REPRODUCING MECHANISM

INVENTORS
GUNARS LICITIS
MARVIN I. GLASS
PETER ALEKSA
BY Lucas & Coffee
ATTORNEYS

SOUND REPRODUCING MECHANISM

INVENTORS
GUNARS LICITIS
MARVIN I. GLASS
PETER ALEKSA
BY Lucas & Coffee
ATTORNEYS

SOUND REPRODUCING MECHANISM

Filed Jan. 16, 1967 5 Sheets-Sheet 4

INVENTORS
GUNARS LICITIS
MARVIN I. GLASS
PETER ALEKSA

BY Lucas & Coffee
ATTORNEYS

SOUND REPRODUCING MECHANISM

INVENTORS
GUNARS LICITIS
MARVIN I. GLASS
PETER ALEKSA

BY Lucas & Coffee
ATTORNEYS

United States Patent Office 3,461,604

Patented Aug. 19, 1969

3,461,604

SOUND REPRODUCING MECHANISM

Marvin I. Glass, Chicago, Gunars Licitis, Lombard, and Peter Aleksa, Chicago, Ill., assignors to Marvin Glass & Associates, Chicago, Ill., a partnership Filed Jan. 16, 1967, Ser. No. 611,532
Int. Cl. A63h 33/26
U.S. Cl. 46—232 8 Claims

ABSTRACT OF THE DISCLOSURE

A motor operated sound reproducing mechanism which is subject to actuation through movement of any one of a plurality of control means to effect the reproduction of a predetermined one of a plurality of messages, and which includes means for preventing interruption of the operation of the sound reproducing mechanism in the event that another one or more of the actuating means is activated during the reproduction of said one message.

Background of the invention

The present invention relates generally to recorded sound reproducing mechanisms and is particularly directed to the use of such mechanism in connection with a toy figure or doll.

The use of sound reproducing means in conjunction with dolls and toys has been very popular, but generally the prior art devices have utilized a single external actuating means for the mechanism which, upon repeated operation, effects either a predetermined sequence of recorded messages or a random sequence of messages. The present invention provides a plurality of operating means for the sound recording mechanism, wherein the operation of any one of such operating means results in the reproduction of a predetermined message which is appropriate to the action of the particluar operating means. In the preferred embodiment, such device is incorporated in a doll wherein various portions of the doll body are movable and the movement of any one portion produces an appropriate recorded message.

Summary of the invention

The invention disclosed herein relates to a sound reproducing mechanism comprising a turntable having a record mounted thereon and including a plurality of separate sound messages, a stylus mounted for movement relative to the record, indexing means operable to selectively position the stylus to reproduce any one of the messages, drive mechanism for rotating the record, and a plurality of manually operable means connected with the indexing means so that operation of one of the manually operable means effects a positioning of the stylus to reproduce a predetermined one of the messages.

It is an object of the invention to provide a doll having relatively movable arms, legs and a head, and including a sound reproducing mechanism which is operable in response to movement of one of the relatively movable parts to produce a predetermined message. Still another object of the invention is to provide a doll having a sound reproducing mechanism therein, wherein the doll has removably attached thereto an appropriate article which upon removal from the doll's person initiates the sound reproducing mechanism. It is also an object of the invention to provide a sound reproducing mechanism including a record of a plurality of discrete messages, means for indexing the stylus with respect to each of such messages and for terminating the operation of the mechanism upon completion of a message, and a plurality of separately operable control means for effecting operation of the sound reproducing mechanism, with each control means cooperating with the indexing means to position the stylus at a predetermined position on the record.

Figure 1:
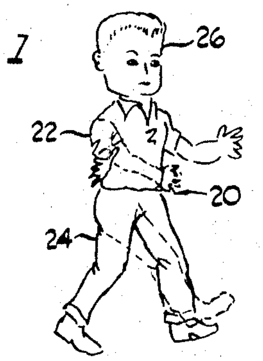
FIGURE 1 is a perspective view of a doll figure embodying the invention, with the mobility of the leg and arm illustrated by the dotted line.
Figure 2:
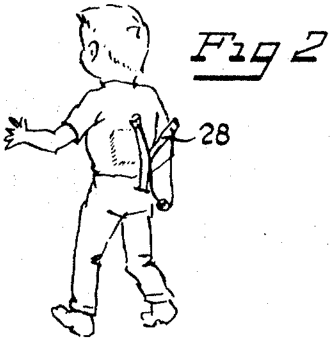
FIGURE 2 is a rear view of the doll figure.
Figures 3, 14, 15:
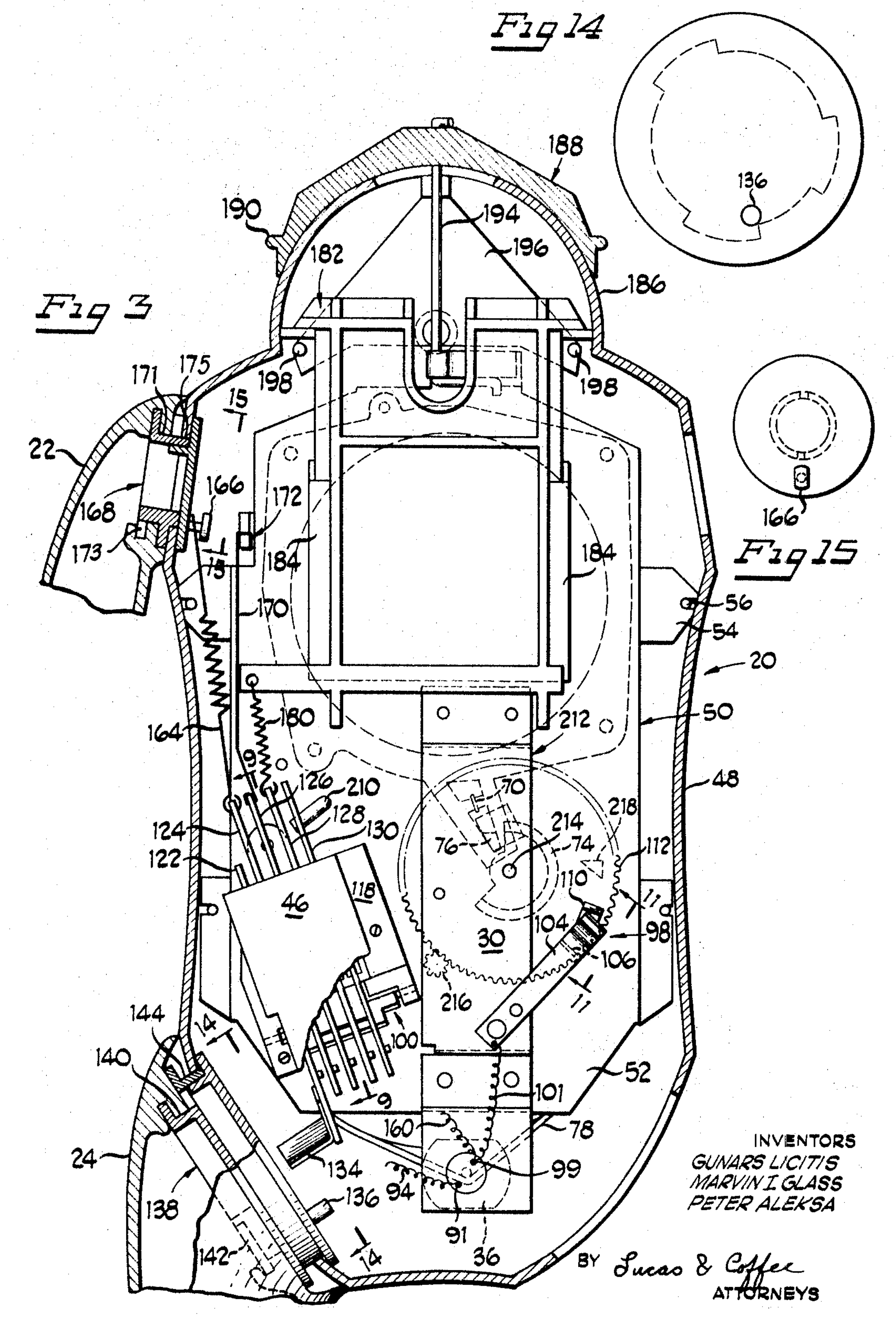
FIGURE 3 is an enlarged, generally along the line indicated at 3—3 in FIGURE 4, front elevational view of the doll figure, with portions broken away and in section in order to illustrate the sound reproducing mechanism within the doll.
FIGURE 14 is a view taken generally along the line 14—14 in FIGURE 3.
FIGURE 15 is a view taken along the line 15—15 in FIGURE 3.

With reference generally to FIGURES 1–3 it will be seen that the selected embodiment of this invention comprises a doll 20 having relatively movable arms 22 and legs 24, and movable head portion 26, and the doll figure carries a removable sling shot 28 in the back pocket of its clothing. Within the doll body is mounted a sound reproducing mechanism 30, including a record 32 (FIGURE 4) mounted on a rotatable turntable 34 for rotation therewith upon operation of a drive motor 36. This mechanism 30 also includes a tone arm 38 having an intermediate portion in continuous engagement with the apex portion 40 of a speaker 42, and the free end of the tone arm carries a stylus or needle 44 in position for engagement with the record. The record 32 is preferably of the continuous groove type, having a plurality of messages recorded thereon with blank groove portions intermediate the messages. A control mechanism indicated generally at 46 in FIGURE 3 is connected with various movable portions of the doll figure and is operable in response to relative movement of such portions to index the tone arm 38 and stylus 44 and to initiate operation of the mechanism 30, so as to reproduce a particular appropriate message and then shut off the mechanism.

Thus, in the illustrated embodiment (FIGURE 3), movement of the right arm 22 will result in the playing of a particular message such as "Shake hands, pal!"; the the movement of the right leg 24 effects the reproduction of a message such as "Okay, I'll sit down!"; the squeezing of a button 177 on the back of the doll body 48 will produce still another message such as "You are my buddy!"; the tilting of the doll's head 26 results in a message such as "Watch out! That's my head!"; and the withdrawal of the sling shot 28 from the back pocket causes the doll to say "Hey, that's my sling shot! If desired, of course, more than one appropriate message could be provided for each of the above described actions of the doll. In the latter instances, two or more concentric grooves or tracks could be cut in the record, each having a series of separate messages or sound sequences, with the messages on adjoining tracks starting and stopping closely adjacent to one another radially of the record. The placement of stylus 44 by the indexing means would thereby result in a random reproduction of one of the closely adjacent messages.

Figure 5:
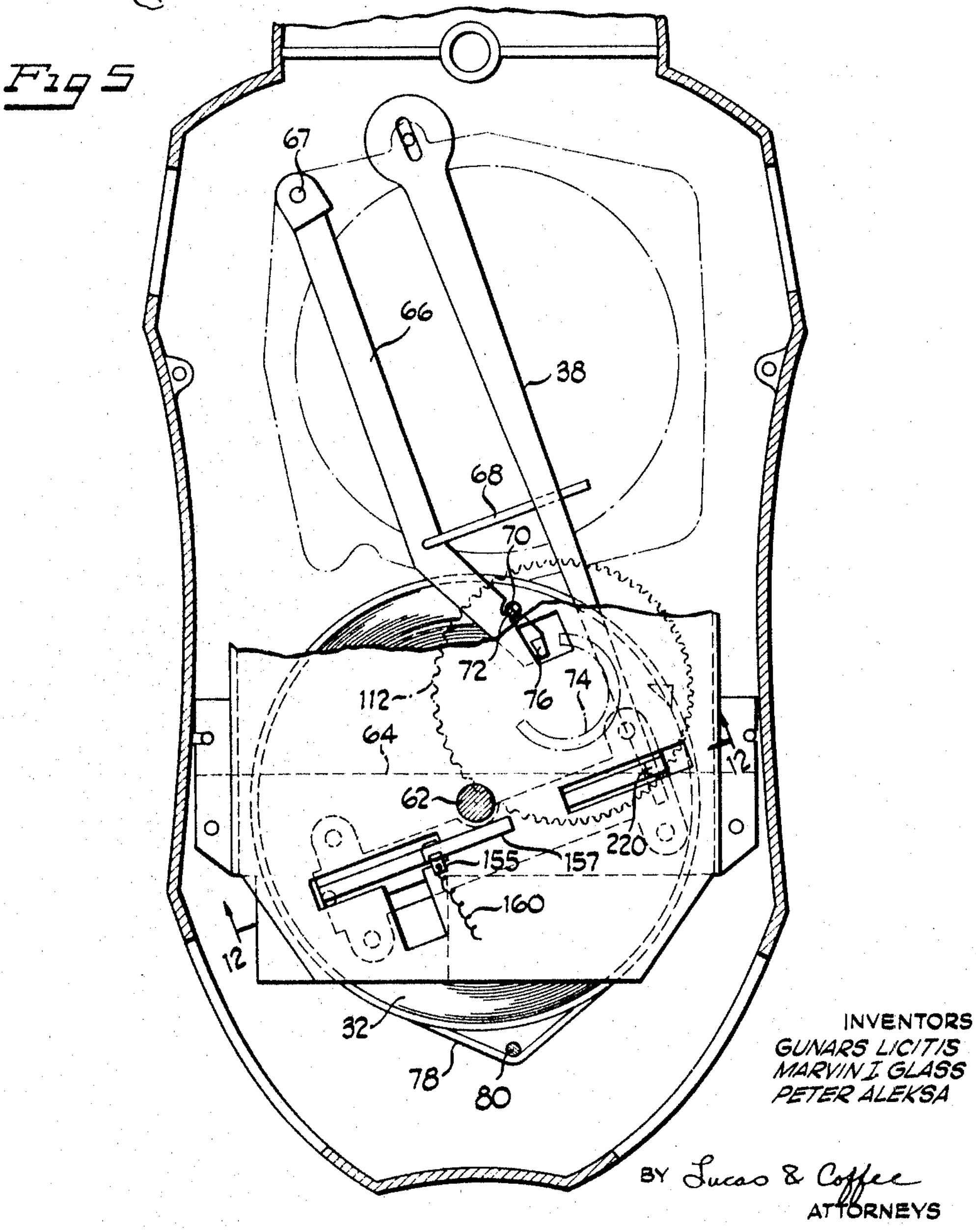
FIGURE 5 is a view taken generally along the line 5—5 in FIGURE 4, with parts omitted or broken away.
Figures 4, 16:
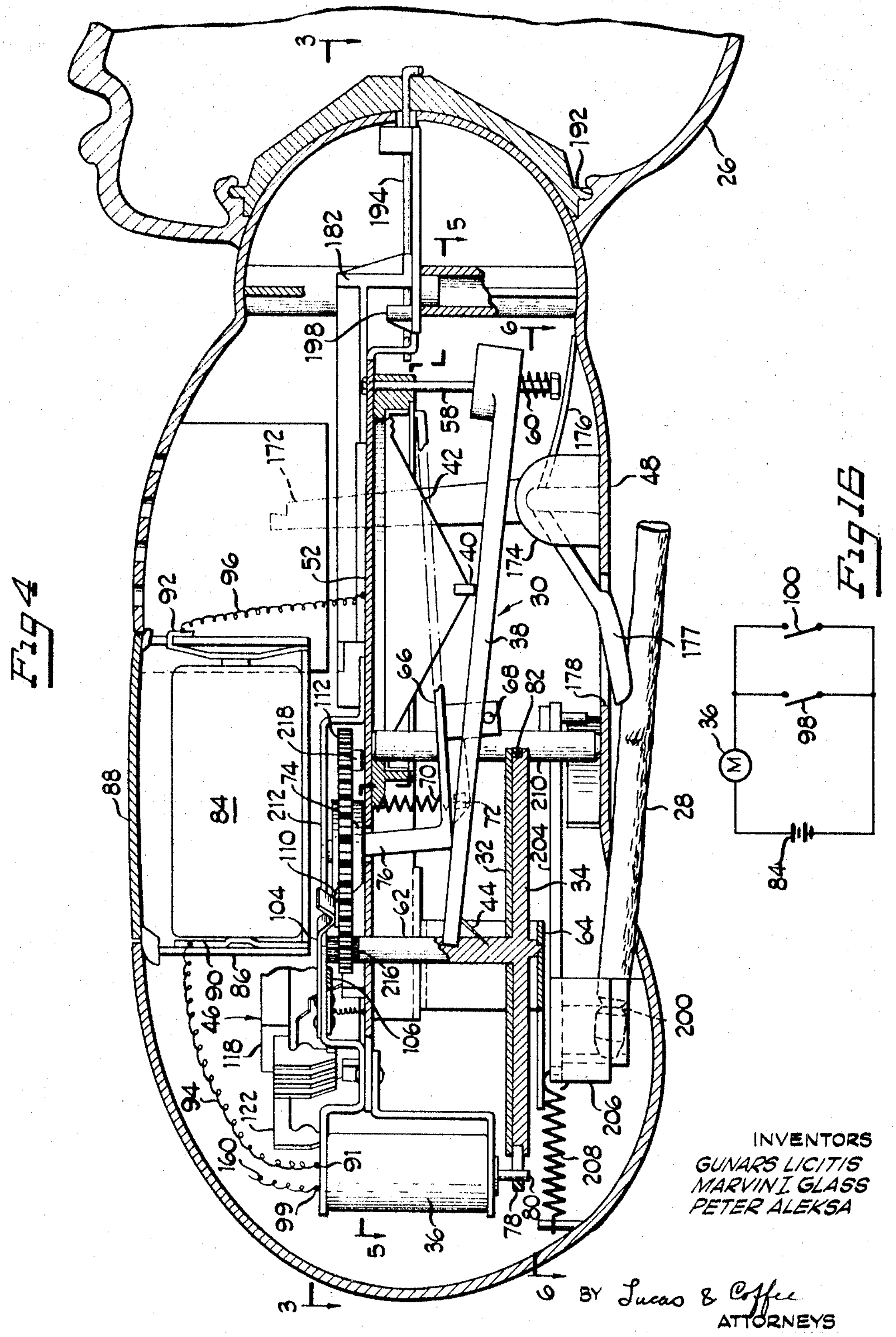
FIGURE 4 is an enlarged side elevational view of the mechanism and doll figure, with portions broken away and in section.
FIGURE 16 is a schematic diagram of the electrical circuit for operating the sound reproducing mechanism.

Referring particularly to FIGURES 3, 4 and 5, it will be noted that the sound reproducing mechanism 30, within the doll comprises a metal frame structure 50 including a plate 52, with the frame fixedly positioned within the body by cooperating tabs 54 on plate 52 and lugs or pins 56 secured to the doll body. The frame supports an acoustical amplifying cone 42 having a rib 40 at its apex for continuous engagement by an intermediate portion of the tone arm 38. The tone arm is pivotally mounted on a shaft 58 carried by the frame, and a coil spring 60 on the lower end of shaft 58 biases the tone arm toward the front of the doll body, i.e. upwardly in FIGURE 4. The free end of the tone arm 38 carries a conventional stylus or needle 44 in overlying relation to a record 32 mounted on the turntable 34. The turntable includes an elongated pivot means 62 which is journaled at its opposite ends in a bracket 212 on plate 52 and in a transverse bracket 64, fixed to plate 52 in depending relation thereto. A tone arm lifter 66 is provided in the form of an elongated member which is pivotally supported at one end on a screw or pin 67 (FIGURE 5), and this tone arm lifter includes a transverse portion or pin 68 underlying the tone arm, so that vertical motion of the lifter arm 66 results in an accompanying movement of the tone arm 38. The lifter arm is biased in an upward direction by a coil spring 70 which is connected at one end to the plate 52 and has its opposite or lower end connected with a pin 72 on the free end portion of the lifter arm. The operation of the tone arm lifter is controlled by means of a rotatable cam 74 which cooperates with a cam follower portion 76 on the free end of a lifter arm. A more detailed description of this mechanism will follow.

The record turntable 34 is circular in form and preferably has the record 32 permanently secured thereto. The turntable is driven by an electric motor 36 through means of a flexible drive belt 78 extending from the motor drive shaft 80 and frictionally disposed around a circular groove 82 in the edge of the turntable. The power for the motor is provided by a battery 84 disposed within a battery box 86 positioned toward the front of the doll body and having a removable cover 88. The electrical circuit between the battery and the motor includes the conventional metal battery terminal clips 90, 92, a conductor or wire 94 extending between one clip 90 and a terminal 91 on the motor 36, a second conductor or wire 96 leading from the other battery terminal 92 to plate 52 having electrical communication with the motor through a pair of switches indicated at 98 and 100 and disposed in parallel in the circuit, as seen in FIGURE 16. In this respect, switch 98 comprises a flexible metal switch element 104 which is electrically connected to the motor terminal 99 (FIGURE 3) through a wire 101 and element 104 is in position for engagement with a terminal 106 (see also FIGURE 4) having connection with metal plate 52. The flexible switch element 104 is normally biased into a closed position and is adapted to be raised to an open position by means of a boss or cam 110 on the upper surface of a large indexing gear 112. As will be explained more fully hereafter, the rotation of the gear 112 is effective to open the switch upon completion of the selected message on the record.

Figure 9:
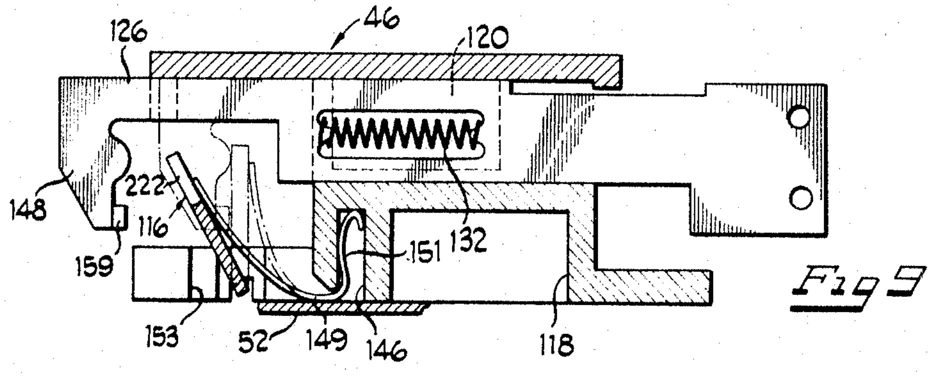
FIGURE 9 is a sectional view taken along the line 9—9 in FIGURE 3.
Figures 10, 11, 12, 13:
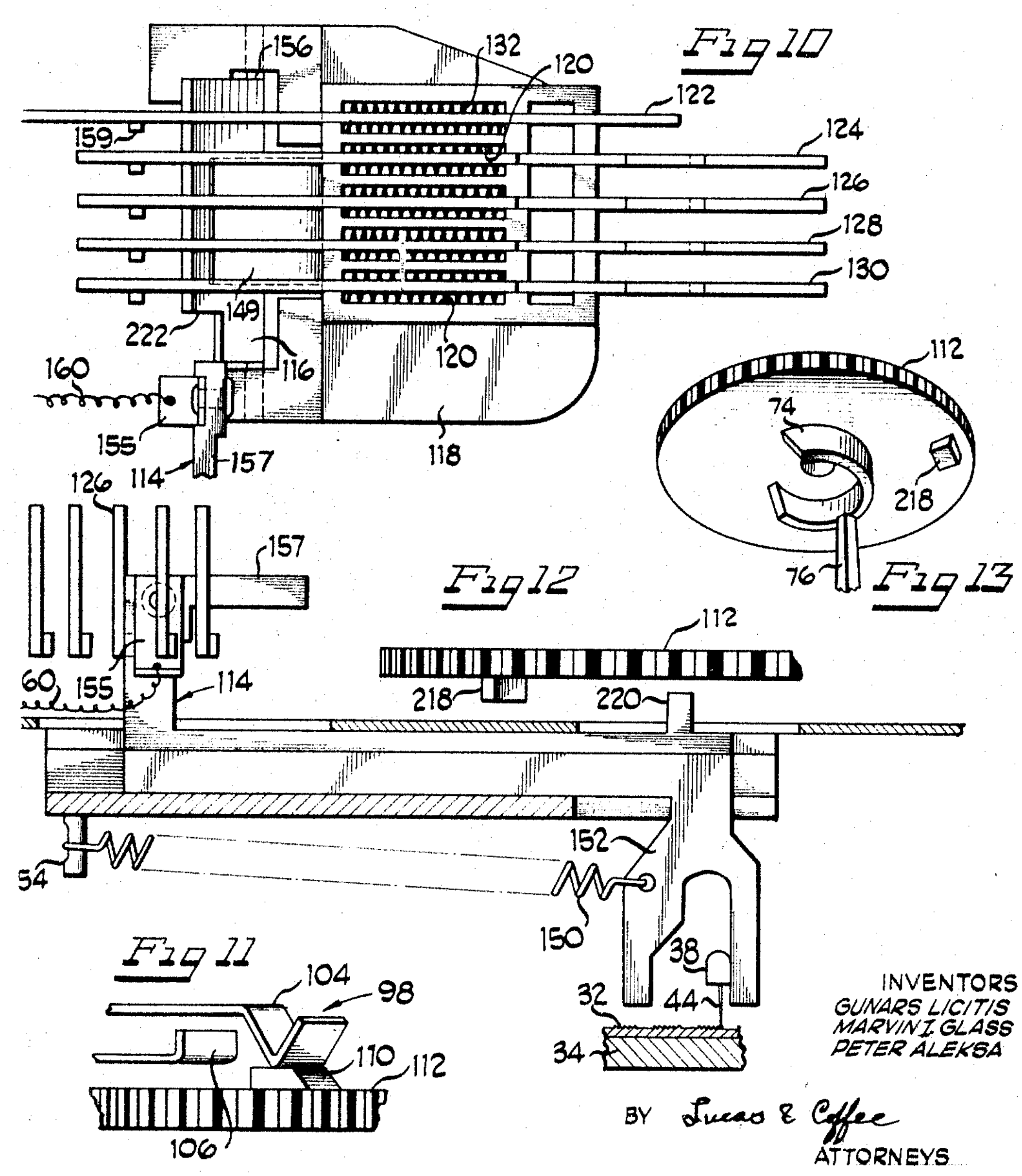
FIGURE 10 is an enlarged fragmentary plan view of the control mechanism seen particularly in FIGURE 3.
FIGURE 11 is an enlarged fragmentary view taken generally along the line 11—11 in FIGURE 3.
FIGURE 12 is an enlarged sectional view taken along the line 12—12 in FIGURE 5.
FIGURE 13 is a bottom perspective view of the indexing gear which is seen also in FIGURES 3, 4 and 12.

In addition to the "off-on" switch 98 just described there is an additional switch 100 controlling the flow of current to the motor, which second switch is a portion of the control and indexing mechanism 46 illustrated particularly in FIGURES 9, 10 and 12. Generally, this second switch comprises a slidable plastic piece 114 (FIGURE 12) having a metal contact 155 on the leading end portion thereon in position for engagement with a pivotally mounted metal blade 116 within control means 46. Blade 116 is connected with plate 52 and contact 155 is connected through a wire 160 with motor terminal 99. As indicated in the wiring diagram in FIGURE 16, it is necessary for only one of the described switches 98, 100 to be closed in order to close the circuit and operate the sound reproducing mechanism 30.

The control means 46, seen particularly in FIGURES 9, 10 and 12, is responsive to particular motions provided for in the doll figure to initially control the operation of the sound reproducing mechanism 30. More particularly, this control mechanism includes a housing 118, preferably of plastic, supported on the metal plate 52 of the main frame and having five parallel slots 120 formed therein, each slidably receiving a control blade element, preferably of metal, indicated at 122, 124, 126, 128 and 130. Each of these elements is biased into its inoperative position, to the left in FIGURE 10, by a coil spring 132 fixed to the blade and abutting against opposite ends of the cavity or slot 120 in the control housing.

With reference particularly to FIGURE 3, it will be seen that the blade 122 on the left carries an angularly bent arm or bracket 134 in position for engagement by a pin 136 on the inner surface of the leg joint 138. Briefly, the leg 24 is pivotally mounted on the lower end of the doll body 48 by a generally cylindrically shaped joint having a lower flanged portion 140 keyed at 142 or otherwise fixed to the leg and having an upper or inner flange portion 144 rotatably mounted in an opening in the doll body. The rotation of the leg 24 from its longitudinally extended position to a forward position, i.e. where the doll is sitting down, causes the pin 136 to engage the arm 134 and move the blade 122 upwardly in the control housing 46. This upward motion of the blade, which is a movement to the right as seen in FIGURES 9 and 10, causes a depending portion 148 at the left of the blade to strike against the pivotally mounted switch plate 116 in the control housing and move the latter to the right (dotted line position) in oppositon to a leaf spring 149. The leaf spring has a bent end portion 151 press-fitted into a groove 146 in the housing, and the free end of the leaf spring bears against the side of the pivoted switch element 116. The rotation of the pivoted switch element 116 to its upright position opens a transverse passageway 153 into which the slidable switch elment 114 is thrust until the leading end of such element engages the depending portion 148 of the control blade. This movement of the slidable element 114 is effected by a coil tension spring 150 (FIGURE 12) secured at one end to an opening in a depending portion 152 of the element and having its other end secured to a post 154 on a portion of the main frame. As the slidable element 114 moves inwardly against the blade 122 at the opposite end of the housing 118, it also underlies each of the four other blade elements 124–130. An elongated portion 157 of the slidable switch element 114 is thus positioned to block off the four remain control blades and prevent their longitudinal movement. In this way there is prevented any interruption of the selected message should another movable portion of the doll be actuated. As the control blade 122 is released from its connection with pin 136, the blade retracts somewhat under the biasing action of its spring 132 to a position wherein a lug 159 (FIGURES 9 and 10) strikes element 114 to thereby hold the arm 134 away from the path of pin 136. Since metal contact 155 has contacted plate 116 and the latter is connected through metal spring 149 with plate 52, the described action of slidable element 114 has closed the circuit between the battery and motor 36 to operate the latter.

The depending portion 152 of the slidable switch element 114 is forked and provides a guide at all times for the positioning of the tone arm 38 and stylus 44. The extent of movement of the switch element 114 inwardly of the control housing determines the positioning of the control arm and consequently determines the portion of the record to be played. FIGURE 12 illustrates the slidable switch positioned against the middle control blade 126, with the stylus 44 in position to play a message toward the center of the recording. The sequence of operation accompanying the movement of one of the blades 122–130 will be more full described later in this description.

The second blade 124, from the left in FIGURE 3, is connected by a wire or the like 164 with a pin 166 on the inner surface of the joint 168 for the right arm 22 of the doll. More particularly, the arm 22 is connected to the upper portion of the body by the generally cylindrical joint 168 having an outer flange portion 171 keyed at 173, or otherwise fixed, to the arm and having an inner flange portion 175 journaled in an opening in the body. Consequently, rotation of the arm causes the joint 168 to rotate and thereby move the pin 166 through an arc. The movement of the right arm from a lowered to a raised position will rotate pin 166 to an upper position and effect upward movement of the blade 124 (to the right in FIGURES 9 and 10) until the blade forces the pivotally mounted contact element 116 to its upright position and permits the switch element 114 with contact 155 to slide into the housing 118 and engage the depending stop portion 148 on the second blade 124. An electrical connection is thereby established between the switch element 114 and the switch plate 116 to actuate the record player, while the three lower blades 126, 128, 130 are blocked out in the manner described above to prevent interruption of the selected message in the event one of the doll portions associated with such blades is moved. Of course, since the slidable switch element 114 has its leading edge abutting the second blade 124, there is also no possibility of the tone arm 38 being repositioned through movement of the first or top blade 122 should the doll's leg be moved.

Figures 6, 7, 8:
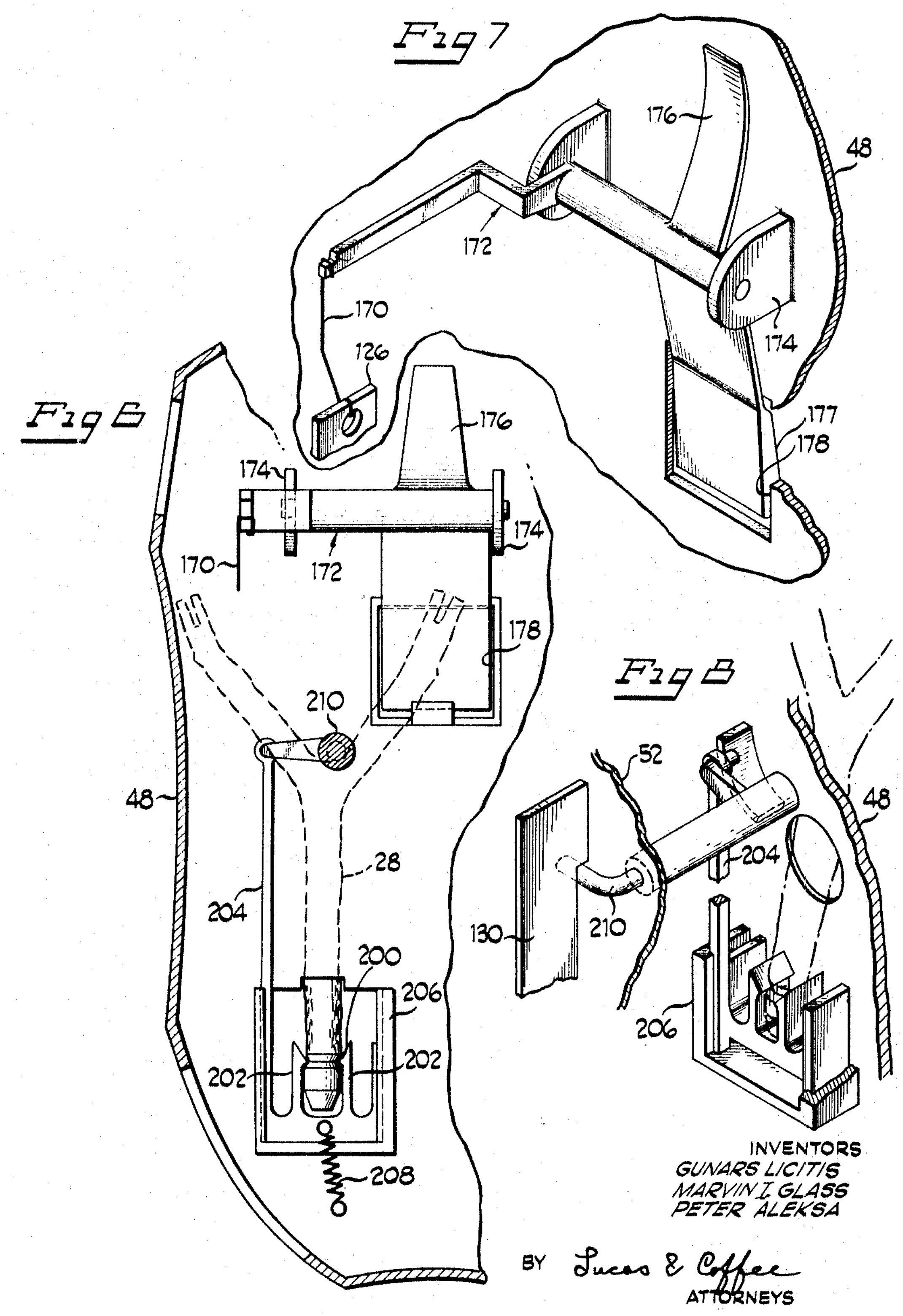
FIGURE 6 is a view taken generally along the line 6—6 in FIGURE 4, with parts broken away and omitted.
FIGURE 7 is a fragmentary perspective view of structure seen in FIGURE 6.
FIGURE 8 is a fragmentary perspective view of additional structure in FIGURE 6.

The third or center blade 126 (FIGURE 3) is connected at its upper end by a wire 170 or the like to a pivotally mounted arm or bracket 172 extending toward the rear of the doll body. More particularly and with reference also to FIGURES 4, 6 and 7, the bracket 172 is journaled on supports 174 fixed to the rear wall of the body and includes a vertically extending spring-like member 176 fixed thereto which has its lower portion accessible through an opening 178 in the back of the body. Depression of this lower portion, as by squeezing the doll body, rotates the bracket 172 and lifts the slide 126 to its operative position, thereby closing contacts 155 and 116 after moving the tone arm to the position on the record having the message appropriate to the hugging action of the doll.

The second slide 128 from the right in FIGURE 3 is connected at its upper end by a coil spring 180 to a generally rectangular frame 182 which is mounted in the doll for vertical sliding movement by means of a pair of elongated guides 184 secured to plate 52 of the main frame. Tilting movement of the head 26 of the doll is effective to move this slidable frame 182 upwardly and thereby place the control slide 128 in its operative position. In the illustrated embodiment, the head 26 of the doll is supported on a generally hemispherical upper end portion 186 of the body by means of a complementary concave joint 188. The joint 188 includes an annular ledge portion 190 fitted within a circular groove 192 (FIGURE 4) formed in the lower part of the head to thereby permit rotation of the head. Extending vertically through the central part of this joint 188 is a rod or the like 194 which has its lower portion fixed to a generally triangular plate 196 having a pair of pins 198 projecting outwardly from the plate at the opposite lower corners. Tilting movement of the head sideways in either direction will cause one of the pins 198 to strike the slidable frame 182 and move it upwardly a sufficient amount to place the control slide 128 in its operative position, wherein the slidable contact 155 is moved into engagement with the pivoted contact 116 to operate the sound reproducing mechanism and the tone arm 38 is indexed to the message appropriate to the movement of the head.

The control slide 130 on the right in FIGURE 3, that is the slide nearest to the movable switch element 114, is controlled by movement of the sling shot 28 out of the rear pocket of the doll figure. As seen particularly in FIGURES 4, 6 and 8, the simulated sling shot includes a reduced end portion 200 which is adapted to be releaseably held between two resilient fingers 202 formed on a slidable part 204 at the rear of the doll body. The slidable part 204 is disposed in a generally rectangular housing 206 and is yieldably held in place by a coil spring 208. The upper end of the slidable part is pivotally connected with the upper end of the control blade 130 through means including a link or arm 210. As the sling shot 28 is withdrawn from the rear pocket of the doll, the slidable part 204 is moved upwardly in its housing and this effects upward movement of the control blade 130. Sufficient pull on the sling shot will cause the two fingers 202 to spread and thereby release the sling shot for withdrawal. As the control slide 130 moves upwardly it functions in the manner previously described for the other control slides to permit the contact blade 155 to move inwardly to establish a flow of current in the electrical circuit and to also position the stylus arm 38 with respect to the appropriate message on the record.

The means for controlling the positioning of the tone arm 38 and for terminating the operation of the sound reproducing mechanism 30 includes the large indexing gear 112. This gear is mounted on a stub shaft 214 which is journaled in the bracket 212 overlying the plate 52 of the main frame. The periphery of the gear 112 is toothed and in meshing engagement with a spur gear 216 fixed to the upper end of the turntable spindle 62. Consequently, rotation of the turntable 34 results in rotation of the indexing gear 112. The top of the indexing gear includes the previously described cam 110 for operating the switch 98, and the lower surface of the gear 112 includes the concentric and partially circular cam surface 74 adjacent its axis and a raised lug 218 adjacent the periphery of the gear. The angularly bent end portion 76 of the tone arm lifter is positioned for engagement with the partially circular cam surface 74, and it will be seen that while the end 76 engages the cam 74 the tone arm 38 is depressed into engagement of stylus 44 with the record 32. As the cam follower end 76 reaches the end of the cam surface 74 and drops off, that is, raises in FIGURE 4, the tone arm 38 will be lifted away from the record through the action of the coil spring 70 and the resulting elevation of the cross-piece 68 on the tone arm lifter 66. The cam 110 on the top of the indexing gear 112 is so related to the partially circular cam 74 on the underside that, as the follower 76 rides off of the cam surface 74 to effect lifting of the tone arm, the continued rotation of the indexing gear causes the cam 110 to strike the end of the flexible switch element 104 and elevate it to open the switch 98 as seen in FIGURE 11. The rotation of the indexing gear 112, is, of course, related to the length of the messages on the record and the disposition of the operating cams just described can be modified to accommodate changes in the length of the recorded messages.

The operation of the described mechanism is as follows. Prior to any movement of an operating doll part, the mechanism 30 is generally in the condition seen in FIGURES 3 and 4, with the tone arm 38 raised above the record 32 and the control switches 98, 100 in their open or inoperative positions. Although it will be apparent that the sound reproducing mechanism can be actuated by movement of any of the several movable parts, including the arm 22, leg 24, head 26, back switch 176, and sling shot 28, it is believed that a description of the complete operation with respect to one of these movements will be sufficient for a proper understanding of the invention. Such operation will be described in detail with respect to the raising of the right arm 22.

When the right arm 22 is raised from a position along side the doll body to a forward position extending away from the front of the body, the pin 166 rotates with the arm joint 168 and causes the wire 164 to pull the slide 124 upwardly within the doll body. This upward movement, to the right in FIGURES 9 and 10, causes the rear portion 148 of the slide to engage the pivotally mounted plate 116 and force the latter into its erect position, as shown in dotted lines in FIGURE 9. At this point the guideway 153 for the slidable contact element 114 is open to permit the contact to move inwardly, under the biasing force of coil spring 150, past the first three slide elements 126, 128 and 130, and into abutting relation with the end portion of the second control slide 124. When the right arm 22 is released sufficiently to permit spring 132 to move slide 124 in the opposite direction, the lug 159 engages the inner face of element 114 to arrest such movement of slide 124 and hold electrical contact 155 in engagement with pivoted blade 116, thereby closing the circuit to operate motor 36 and turntable 34. Further, the rotation of the turntable and spur gear 216 causes a rotation of the indexing gear 112 to thereby move the flexible contact element 104 (FIGURE 11) off of the cam 110 and into engagement with the lower contact element 106. Thus, upon completion of the inward movement of the slidable contact element 155 into the control housing 118 both of the control switches 98, 100 are closed. The rotation of the motor drive shaft is, of course, transmitted through the drive belt 78 to the record turntable 34. Initially, the tone arm lifter 66 is in the raised position, seen in FIGURE 4, with the cam follower 76 portion engaging the cam surface 74 on the underside of the indexing gear 112. The inward movement of the slidable contact element 114 has carried the elevated tone arm 38 with it, through guiding movement of the fork 152, to thereby index the tone arm above the message on the record appropriate to the action of the doll. For example, the described lifting of the right arm 22 causes the slidable member 114 and the guide fork 152 to position the needle 44 above a message such as "Shake hands, pal!"

When the indexing gear 112 has rotated sufficiently to permit the cam follower 76 to move onto the circular cam surface 74 to thereby drop the tone arm 38, the stylus 44 is placed in engagement with the rotating record 32. In this respect, it should be noted that the release of the tone arm by its lifter permits the compressed coil spring 60 at the pivot end of the tone arm to raise the pivot end and swing the tone arm about its bearing point on the rib 40 at the lower end of the amplifying cone 42. The tone arm 38 is always in engagement with this rib 40 and is pivoted about such beairng point as the tone arm support 66 is raised and lowered.

The engagement of the stylus 44 with the groove in the record, of course, produces the sounds recorded thereon, which are amplified through constant engagement of the tone arm with the apex of the amplifying cone 42. As indicated previously, the effective or operating surface of the circular cam 74 is correlated with the length of the message, so that subsequent to the completion of one message and prior to the start of the succeeding message the follower 76 slides off the cam surface 74 and thereby permits the tone arm support 66 to be raised by action of the tension coil spring 70 supporting its free end. This, of course, raises the stylus and tone arm upwardly and away from the record. At this time, the lug 218 on the underside of the indexing gear 112 strikes a vertical projection 220 on the slidable member element 114 and moves the latter to the right as seen in FIGURE 12, thereby withdrawing the element 114 from the control housing 118 to open the contact between switch part 155 and element 116 letting pivoted member 116 return to its position seen in full in FIGURE 9. Member 220 is thereafter released from engagement by cam 218 (FIGURE 12) and slidable element 114 returns to the left until its leading edge bears against the cut away edge portion 222 on pivoted plate 116. Continued rotation of gear 112 (switch 98 being still closed) causes the cam 110 on the upper side of the indexing gear 112 to strike the end of the flexible contact element 104 and raises the latter to open the switch 98 and stop the flow of current in the circuit to shut off the motor 36.

Subsequent movement of the doll's leg, sling shot, etc. will cause a repetition of the above described sequence of operations, with the exception that the tone arm will be differently located radially of the record due to the fact that the slidable contact 114 is moved into engagement with one of the other blades in the control housing.

Thus it is seen that there is described herein a sound reproducing mechanism which is subject to operation through movement of any one of a plurality of movable parts, in this instance portions of the doll figure, and which positively selects a predetermined appropriate message for each such movement. Further, the described mechanism renders it impossible to interrupt one of the recorded messages or to otherwise affect the operation of the mechanism by movement of one or more of the other control parts once the sound reproducing mechanism has been activated. Although shown and described with respect to particular mechanism, it will be apparent that various modifications might be made without departing from the principles of this invention.

What is claimed is:

1. A sound reproducing mechanism for use in a toy, said mechanism comprising a turntable having a record mounted thereon, said record having a plurality of separate sound sequences recorded thereon, a stylus mounted for movement relative to said record, indexing means operable to selectively position said stylus on said record to reproduce any one of said sound sequences, drive mechanism for rotating said turntable and record, a plurality of manually operable means connected with said indexing means, said indexing means including a plurality of relatively movable control elements each connected with one of said manually operable means and operative in response to movement thereof to position said stylus to reproduce a predetermined one of said messages, and said indexing means also including a member which is movable in response to movement of one of said manually operable means into a position rendering ineffective the remainder of said control elements after one such element has been moved to position said stylus so as to assure the complete playing of a selected message without interference in the event another control element is moved.

2. A sound reproducing mechanism as set forth in claim 1, wherein said drive mechanism is electrically powered and said indexing means includes electrical switch means which is closed in response to movement of one of said control elements to initiate operation of the sound reproducing mechanism.

3. Sound reproducing mechanism for use in a toy, said mechanism comprising a frame, a turntable carried by said frame and having a record mounted thereon, said record having a plurality of separate sound messages recorded thereon, a tone arm pivotally mounted on said frame and including a stylus at its free end in position for engagement with the record, an acoustical amplifying cone mounted on the frame with its apex positioned for engagement by an intermediate portion of said tone arm, indexing means for said control arm and stylus comprising a housing mounted on said frame, a plurality of elongated members supported in said housing in parallel relation to one another, a guide means for said tone arm having one end portion adapted to engage and move the stylus portion radially of the record and having the other end portion in position to move into said indexing housing through a path intersecting the path of movement of said elongated members, means biasing said guide means in the direction of said housing, and means in said housing disposed to normally block the path of movement of said guide means and responsive to movement of any one of said elongated members to permit said guide means to enter said housing and abut against said one elongated member, whereby said guide means is positioned to place said stylus at a particular message on the record.

4. Sound reproducing mechanism as set forth in claim 3, including a motor driven mechanism for operating said turntable, and an electrical circuit including a source of power for the motor and a switch for controlling the flow of electricity to the motor, said switch being operable in response to movement of said guide means into said housing to close the circuit.

5. In combination with a toy, sound reproducing mechanism completely enclosed therein including a record having a plurality of discrete recorded sound sequences thereon, drive mechanism including an electric motor and battery to rotate said record, an electrical circuit for said drive including a pair of switch means in parallel in the circuit for making and breaking the circuit between said battery and motor, stylus means mounted for movement relative to said record, indexing means including portions guidedly engaging said stylus means and operable to selectively position said stylus means to reproduce any one of said sound sequences, a plurality of relatively movable means on the outside of said toy each of which is connected with said indexing means and operable through said indexing means to cause a predetermined one of said sound effects to be reproduced, and said indexing means includes parts which are operable to close the first of said switch means and to temporarily render inoperative the remainder of said relatively movable means, to immediately thereafter close the second of said switch means, to open said first switch means upon completion of the selected sound sequence and remove said stylus means from the record, and finally open said second switch means to open said circuit and halt the operation of said drive mechanism.

6. A phonograph device for use in a figure toy having a relatively movable head, arm, and leg and including means adapted to releasably support an article externally of the figure, and phonograph device comprising a rotatably mounted record having recorded thereon a plurality of discrete sound sequences arranged to be separately reproduced, stylus means supported for movement relative to said record, drive mechanism including an electric motor and battery to rotate said record, and a stylus control and indexing means operably interconnecting said stylus means with said movable head, arm and leg and with said releasable support means for said article, so that manual movement of any one of said movable means on the toy causes said stylus means to be positioned for the reproduction of a predetermined one of said sound sequences on said record.

7. A phonograph device as set forth in claim 6, including switch means in the electrical circuit for said drive mechanism, which is operated by said indexing means and in response to movement of one of said movable means to close the circuit and actuate the drive mechanism so as to position the stylus to reproduce said predetermined sequence and to remove said stylus from the record and stop the drive mechanism after completion of said predetermined sequence.

8. In combination with a toy, sound reproducing mechanism enclosed therein and including a record with a plurality of discrete message thereon, mechanism including an electric motor and battery to rotate said record, stylus means mounted for movement relative to said record, and indexing means connected with said stylus and operable to selectively position said stylus in engagement with any one of said messages on the record, a plurality of relatively movable means on the outside of said toy with each movable means being individually connected with said indexing means and cooperable therewith to effect positioning of said stylus for reproduction of a particular message upon actuation of any one of said movable means, and said indexing means further including an element which is movable upon actuation of one of said movable means to a position rendering ineffective the remainder of said plurality of movable means with respect to said indexing means during the reproduction of said particular message associated with said one movable means.

References Cited

UNITED STATES PATENTS

| | | | |
|---|---|---|---|
| 2,505,626 | 4/1950 | Palmer | 46—232 |
| 2,952,464 | 9/1960 | Stimler | 274—15 |
| 3,165,320 | 1/1965 | Ryan. | |
| 3,234,687 | 2/1966 | Elwell | 46—232 |

F. BARRY SHAY, Primary Examiner

H. DINITZ, Assistant Examiner

U.S. Cl. X.R.

46—118; 274—1.1